United States Patent
Maekawa

(10) Patent No.: US 6,805,845 B1
(45) Date of Patent: Oct. 19, 2004

(54) EXHAUST GAS TREATMENT SYSTEM

(75) Inventor: Teisuke Maekawa, Tokyo (JP)

(73) Assignee: Taikisha Ltd., Tokyo (JP)

(*) Notice: Subject to any disclaimer, the term of this patent is extended or adjusted under 35 U.S.C. 154(b) by 840 days.

(21) Appl. No.: 09/654,820

(22) Filed: Sep. 5, 2000

(30) Foreign Application Priority Data

Sep. 6, 1999 (JP) .......................................... 11-251366

(51) Int. Cl.[7] .......................... B01D 50/00; B01D 53/34
(52) U.S. Cl. ........................................ 422/177; 422/190
(58) Field of Search .................................. 422/177, 190, 422/199, 244; 60/39.34, 272, 39.01, 39.07

(56) References Cited

U.S. PATENT DOCUMENTS

| | | | | |
|---|---|---|---|---|
| 3,968,649 A | * | 7/1976 | Edwards | 60/297 |
| 4,265,088 A | * | 5/1981 | Funk | 60/648 |
| 4,576,005 A | * | 3/1986 | Force | 60/618 |
| 4,659,448 A | * | 4/1987 | Gordon | 204/277 |
| 5,899,175 A | * | 5/1999 | Manikowski et al. | 123/3 |
| 6,298,651 B1 | * | 10/2001 | Iijima | 60/780 |

* cited by examiner

*Primary Examiner*—M. Alexandra Elve
(74) *Attorney, Agent, or Firm*—Webb Ziesenheim Logsdon Orkin & Hanson, P.C.

(57) ABSTRACT

An exhaust gas treatment system includes a condensing device for condensing an organic component contained in exhaust gas to be treated so as to produce condensed gas with an enhanced organic component concentration, a gas turbine for receiving the condensed gas from the condenser device as oxygen-containing combustion gas and then generating power, and a generator operable to receive the power from the gas turbine for generating electric power.

6 Claims, 4 Drawing Sheets

EXHAUST GAS TREATMENT SYSTEM

BACKGROUND OF THE INVENTION

1. Technical Field of the Invention

The present invention relates to an exhaust gas treatment system for treating exhaust gas containing organic component, such as exhaust gas generated from a painting facility, a semiconductor/electronic component manufacturing factory, etc. More particularly, the invention relates to such exhaust gas treatment system adapted for treating the exhaust gas by oxidizing/decomposing the organic component contained in the gas.

2. Description of the Related Art

For oxidizing/decomposing an organic component contained at a low concentration in exhaust gas to clean the exhaust gas and also recovering the heat generated in association with the decomposition for use as an energy source for running the factory (e.g., as energy source for the main production activity of the factory), there have been proposed and practiced a variety of schemes as follows. According to one such scheme, the organic component in the exhaust gas is condensed by means of a condensing device to produce condensed gas having an enhanced concentration of organic component. Then, this condensed gas is charged into a combustion device adapted for exhaust gas treatment, such as direct combustion type, catalytic combustion type, regenerative combustion type device, etc., so that the organic component is combusted therein, and the heat retained in the resultant combustion exhaust gas (i.e., cleaned gas) from the combustion device is recovered through a heat exchanger. According to another scheme, the treatment-object exhaust gas or the condensed gas thereof is fed, together with oxygen-containing combustion gas, to a burner of a boiler used as the heat source of the factory, so that the organic component therein is combusted and the heat generated during the oxidation/decomposition of the organic component in the exhaust gas is collected in the form of steam generated from the boiler.

The prior art has proposed still another scheme whose implementing system is illustrated in FIG. 4. It is said that this scheme, in addition to the oxidation/decomposition of the organic component in the exhaust gas, provides a further advantage over the above-described schemes by allowing even more efficient utilization of the decomposition heat (ie., the chemical energy present within the organic component in the exhaust gas) for the factory operation. More particularly, in the system implementing this scheme, treatment-target exhaust gas A is charged, as the oxygen-containing combustion gas, into a gas engine 30 together with a fuel G so as to run this engine 30. Then, the organic component in the gas A will be subjected to oxidation/decomposition process during the combustion process in the engine 30. Further, a generator 31 is driven by the output of this engine to generate electric power E which in turn is used for the main factory operation; and also the heat retained in engine exhaust gas D exhausted from the engine 30 is recovered by a heat exchanger 32 to be used as heat source which is to be used also for the main factory operation.

With the above-described exhaust gas treatment system utilizing a gas engine (i.e., a so-called "co-generation system" modified to act also as an exhaust gas treatment system), the oxidation/decomposition heat of the organic component is recovered in the form of electric power E. Thus, compared with the conventional systems in which the oxidation/decomposition heat of the organic component in exhaust gas is recovered in the form of heat recovered from the combustion exhaust gas or steam generated from a boiler, the above system may utilize the oxidation/decomposition heat of the organic component of exhaust gas more efficiently as energy source for factory operation. Hence, enhanced energy saving and further reduction in $CO_2$ generation may be obtained.

With such gas engine, however, its intake amount of oxygen-containing combustion gas (i.e., combustion air) is rather limited. Thus, according to such exhaust gas treatment system using a gas engine, even if this system employs the scheme of feeding the condensed gas which has its organic component concentration enhanced and its amount reduced by a condensing device to the gas engine 30 as the oxygen-containing combustion gas therefor, it is difficult for this system to efficiently treat a large amount of exhaust gas with a low concentration of organic component generated from a painting facility or semiconductor/electronic component manufacturing factory. For this reason, in those factories which generate a relatively large amount of exhaust gas needing treatment, as illustrated in FIG. 5, if a co-generation system using a gas engine (i.e., a system in which a generator 31 is driven by a gas engine 30 and heat retained in the exhaust gas D from the engine is recovered through a heat exchanger 32) is to be implemented for achieving higher energy saving and $CO_2$ generation reducing effects, this is feasible only through the conventional scheme in which condensed gas B' with organic component concentration enhanced through a condensing device 1 is introduced into an exhaust-gas treating combustion device 33 for combustion of the organic component therein (or through the alternative conventional scheme, illustrated in this FIG. 5 by broken lines, in which only a portion of the exhaust gas A to be fed to the exhaust-gas treating combustion device 33 or condensed gas B' thereof is fed to the gas engine 30 as its oxygen-containing combustion gas).

In view of the above-described state of the art, a primary object of the present invention is to provide an exhaust gas treatment system capable of achieving efficient treatment of a large amount of exhaust gas by recovering oxidation/decomposition heat of organic component in the exhaust gas in the form of electric energy as well as equivalent or higher energy saving effect and $CO_2$ generation reducing effect as compared with the conventional exhaust gas treatment system using a gas engine.

SUMMARY OF THE INVENTION

For fulfilling the above-noted object, according to the present invention, an exhaust gas treatment system comprises:

a condensing device for condensing an organic component contained in exhaust gas to be treated so as to produce condensed gas with an enhanced organic component concentration;

a gas turbine for receiving the condensed gas from the condenser device as oxygen-containing combustion gas and then generating power; and a generator operable to receive the power from the gas turbine for generating electric power.

Compared with a gas engine of an equivalent output, a gas turbine allows a larger intake of oxygen-containing combustion gas. Therefore, if the gas turbine is driven by both fuel and the exhaust gas as its oxygen-containing containing combustion gas, the gas turbine can treat a large amount of exhaust gas by oxidizing and decomposing the organic component in the exhaust gas through its combustion therein in a more efficient manner than the above-described gas-engine type system shown in FIG. 4; and heat generated in association with the oxidization/decomposition process may be recovered in the form of electric energy from the generator driven by the gas turbine.

Such gas turbine, however, consumes a larger amount of fuel than a gas engine of equivalent output. Therefore, if exhaust gas with a relatively low organic component concentration (e.g., exhaust gas with an organic component concentration ranging 100 to 500 ppm approximately), such as the exhaust gas generated from a painting facility or semiconductor/electronic component manufacturing factory, is directly fed to the gas turbine as the oxygen-containing combustion gas, the reduction in the fuel consumption amount enabled by the introduction of the organic component of the exhaust gas will be rather limited, so that the fuel consumption amount of the entire system will be still greater than the conventional gas-engine type treatment system and its energy saving effect and $CO_2$ generation reducing effect will be low or unsatisfactory correspondingly.

Then, according to the system of the present invention described above, the system includes a condensing device for condensing an organic component contained in exhaust gas to be treated so as to produce condensed gas with an enhanced organic component concentration. Then, if this condensed gas generated from this condenser device is supplied to the gas turbine as the oxygen-containing combustion gas, the gas turbine, due to its larger intake of combustion gas, can receive a significantly greater amount of organic component than the case when the turbine directly receives a same amount of non-condensed exhaust gas as the condensed gas. Consequently, the system can treat an even greater amount of exhaust gas and at the same time the fuel consumption amount of the generator per unit electric power generation amount may be reduced effectively. Therefore, this system of the invention achieves substantially same or even higher energy saving effect and $CO_2$ generating reducing effect, compared not only with the conventional system of FIG. 5 implementing the co-generation scheme using a gas engine, but also the system in which the exhaust gas is directly supplied to a gas engine as oxygen-containing combustion gas, or the conventional system of FIG. 4 in which condensed gas with organic component concentration enhanced through a condensing device is supplied to a gas engine as oxygen-containing combustion gas.

Further, exhaust gas from such gas turbine has a higher temperature than exhaust gas from a gas engine. Then, if the heat retained in the turbine exhaust gas is recovered during the above-described gas turbine operation using the condensed gas as oxygen-containing combustion gas, much greater amount of heat can be recovered in the form of high-temperature (hence, of greater utility) heat than the conventional system recovering the heat from gas engine exhaust gas. In this respect too, the energy saving effect and $CO_2$ generation reducing effect may be further promoted.

As described above, the system of the invention achieves efficient treatment of a large amount of exhaust gas with a low organic component concentration as well as higher energy saving effect and $CO_2$ generation reducing effect. Moreover, in comparison with the conventional exhaust gas treatment system of FIG. 5 implementing the co-generation scheme, the system of the invention can achieve also overall system cost reduction by eliminating the combustion device 33 required by the conventional system.

For ensuring the substantially same or higher energy saving effect and $CO_2$ generation reducing effect, it is preferred that the condensed gas to be fed to the gas turbine as oxygen-containing combustion gas has an organic component concentration of 3000 ppm or higher.

Also preferably, the condensing device comprises an adsorbing-desorbing device by effecting an adsorbing step for adsorbing the organic component of the exhaust gas onto an adsorbent layer by causing the gas to pass the adsorbent layer and a desorbing step for desorbing the adsorbed organic component into a desorbing gas, which is smaller in its amount than the exhaust gas, by causing desorbing gas to pass the adsorbent layer after the adsorbing step, the device effecting the adsorbing step and the desorbing step for a plurality of cycles, so that the desorbing gas delivered from the adsorbent layer during the desorbing step is collected as the condensed gas to be discharged from the condensing device.

With the above-described adsorbing-desorbing type condensing device, with execution of repeated cycles of the adsorbing step and the subsequent desorbing step, the organic component in the exhaust gas is transferred from the exhaust gas into the smaller amount of desorbing gas, so that the organic component in the gas is concentrated to produce the condensed gas (i.e., the desorbing gas delivered from the adsorbent layer during the desorbing step) with enhanced concentration of organic component. This type of adsorbing-desorbing device is already in wide use in the above-described conventional exhaust gas treatment systems using a combustion device for exhaust gas treatment. Hence, in implementing the exhaust gas treatment system (i.e., system including a gas turbine) of the invention, if such adsorbing-desorbing type device is employed as the condensing device and the condensed gas produced by this device is supplied to the gas turbine as its oxygen-containing combustion gas, the system can be readily implemented by utilizing such commonly used adsorbing-desorbing type device and such implemented system will provide advantage of high reliability also.

Still preferably, the adsorbing-desorbing type condensing device is adapted to effect the adsorbing step and the desorbing step in parallel and continuous manner (e.g., a rotary adsorbing-desorbing device including an adsorbing rotor having an adsorbent layer with a plurality of adsorbing areas and desorbing areas alternatively arranged along a rotational path of the rotor, or a multi-adsorbing tower type device for selectively effecting the adsorbing step or desorbing step for each adsorbent layer by e.g., effecting the adsorbing step at one or some of the adsorbing layers while effecting the desorbing at another or other adsorbing layers at the same time). With this, the condensing device can continuously supply the condensed gas to the gas turbine as the oxygen-containing combustion gas.

Still preferably, in the exhaust gas treatment system of the invention, the adsorbing-desorbing type condensing device includes a sorting means for sorting the desorbing gas delivered from the adsorbent layer during the desorbing step between an earlier passage gas which passed the adsorbent layer at an earlier stage of the desorbing step and a later passage gas which passed the adsorbent layer at a later stage of the desorbing step and for subsequently causing the earlier gas, as an additional portion of the exhaust gas, to pass the adsorbent layer again at a subsequent adsorbing step while allowing the later passage gas to be discharged directly as the condensed gas.

With the above-described construction, by the sorting means, the desorbing gas delivered from the adsorbent layer during the desorbing step is sorted between the earlier passage gas which passed the adsorbent layer at an earlier stage of the step when the temperature of the adsorbent layer is still low and the efficiency of the desorption of the condensation-target component therefrom is also correspondingly low and the later passage gas which passed the adsorbent layer at a later stage of the step when the adsorbent layer has been heated to a sufficiently high temperature and the efficiency of the desorption of the target component therefrom is also correspondingly high. Consequently, the desorbing gas is sorted between a desorbing gas portion (i.e., earlier passage gas) delivered from the adsorbent layer with low or insufficient organic component concentration and a further desorbing gas portion (i.e., later passage gas) delivered from the adsorbent layer with high or sufficient organic component concentration.

Then, the earlier passage gas, because of its low organic component concentration, is caused to pass, as an additional portion of the treatment-object exhaust gas, again the adsorbent layer, so that the organic component contained therein is adsorbed to the adsorbent layer and then this adsorbed component is desorbed in the subsequent desorbing step into the small amount and higher temperature desorbing gas. On the other hand, the later passage gas delivered from the adsorbent layer with a high organic component concentration is directly collected as the condensed gas product and fed to the gas turbine as the oxygen-containing combustion gas.

That is to say, the earlier passage gas delivered from the adsorbent layer with low or insufficient organic component concentration is subjected to the condensing process again; and only the later passage gas delivered from the adsorbent layer with high or sufficient organic component concentration is collected as the condensed gas. With this, compared with a construction collecting the entire amount of the desorbing gas delivered from the adsorbent layer during the desorbing step, the concentration rate of the organic component in the exhaust gas may be effectively enhanced while avoiding adverse effect of the earlier sage of the desorbing step when the desorbing efficiency is still low (in this respect, see the U.S. application Ser. No. 09/532,252 filed on Mar. 22, 2000 by the same applicant). As a result, the concentration of the organic component in the condensed gas to be supplied as the oxygen-containing combustion gas to the gas turbine may be effectively enhanced and the energy saving effect and the $CO_2$ generation reducing effect of the exhaust gas treatment system according to the invention may be further promoted Incidentally, with appropriate setting of the "sorting point or timing" where the earlier passage gas and the later passage gas are sorted from each other, since the concentration of the organic component in the earlier passage is rather low and also since the desorbing gas is smaller in its amount and the earlier passage gas is even smaller in its amount, the addition of this earlier passage gas to the exhaust gas as an additional portion thereof, when caused to pass the adsorbent layer in the adsorbing step, will not cause any significant increase in the processing load in the adsorbing process, so that resultant reduction in the adsorbing capacity for the organic component in the exhaust gas may be kept minimal. Hence, the adsorbing capacity for the organic component in the exhaust gas may be maintained sufficiently high without requiring physical enlargement of the adsorbent layer.

That is to say, provided that the conventional condensing device originally provides a concentration rate on the order of 20 times, this device, if modified with the addition of the sorting means will be able to readily provide a concentration rate on the order of 40 times.

Preferably, in the exhaust gas treatment system of the invention, the condensing device is capable of providing a concentration rate of 30 times or more of the organic component in the exhaust gas.

Namely, when the exhaust gas having an organic component concentration of 100 to 500 ppm approximately, such as exhaust gas generated from a painting facility or semiconductor/electronic component manufacturing factory, is to be treated by the exhaust gas treatment system of the present invention, with use of such condensing device capable of providing a concentration rate of 30 times or more of the organic component in the exhaust gas, the system will be able to stably maintain substantially same or even higher energy saving effect and $CO_2$ generation reducing effect as or than the conventional system using a gas engine, irrespectively of slight variation in the organic component concentration in the exhaust gas to be treated.

Alternatively, for the purpose of feeding, to the gas turbine as the oxygen-containing combustion gas, the condensed gas having organic component concentration enhanced by the condensing device, the system may include a plurality of such condensing devices (e.g., a plurality of adsorbing-desorbing type devices) for effecting the concentration process of the organic component in multiple of steps for increasing the concentration rate in step-by-step manner.

Further and other objects, features and advantages of this invention will become apparent from the following detailed description of the preferred embodiments thereof with reference to the accompanying drawings.

DESCRIPTION OF THE PREFERRED EMBODIMENTS

Figure 1:
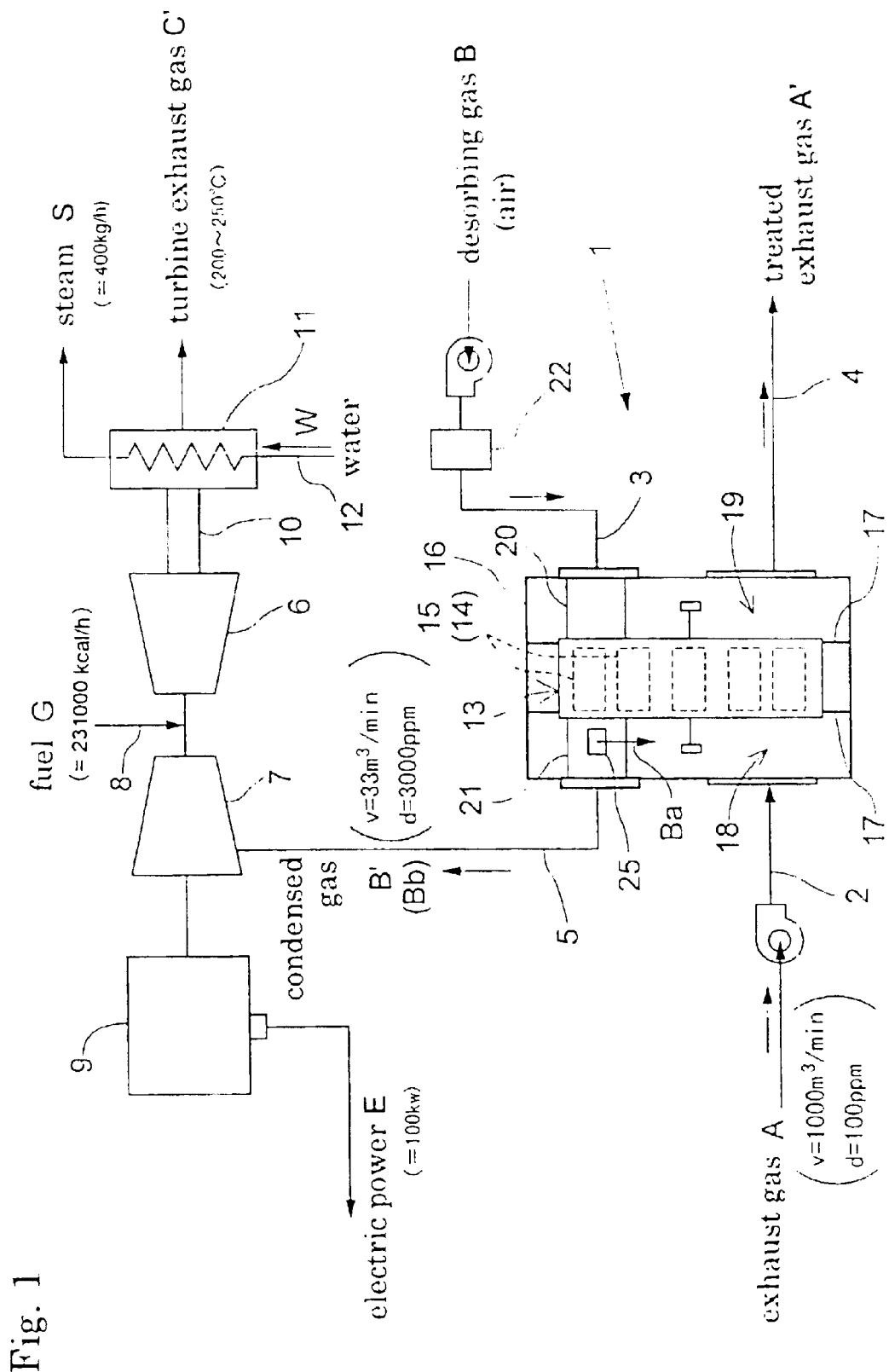
FIG 1 is a schematic construction view showing an exhaust gas treatment system according to a preferred embodiment of the present invention.

FIG. 1 shows an exhaust gas treatment system for treating exhaust gas A generated from a painting facility or semiconductor/electronic component manufacturing factory and containing an organic solvent therein as an example of organic component, the system including a gas turbine according to the sprit of the invention.

Numeral 1 denotes a condensing device for condensing the organic solvent or component (e.g., toluene, xylene or the like) contained at a low concentration within the exhaust gas A so as to produce condensed gas B' with higher organic component concentration. For this condensing process, a desorbing gas B (air in the instant embodiment) smaller in amount than the treatment-object exhaust gas A is introduced through a desorbing gas inlet passage 3 for transferring the organic component from the exhaust gas A into this small amount of desorbing gas B.

Numeral 4 denotes a treated exhaust gas discharge passage for taking off the treated exhaust gas A' (cleaned gas) after the transfer of its organic component into the desorbing gas B and discharging this treated gas A' to the outside of the system. Numeral 5 denotes a condensed gas outlet passage for taking off the desorbing gas after the transfer of the organic component thereto from the exhaust gas A as a produced condensed gas B' out of the condensing device 1.

Numeral 6 denotes a gas turbine including a compressor 7 associated therewith. This gas turbine 6 receives the produced condensed gas B' as oxygen-containing gas from the condensing device 1 through the condensed gas outlet passage 5 and the associated compressor 7 and receives also fuel G (e.g., natural gas) through a fuel supply passage 8, so that the turbine operates on this gas and fuel to generate power.

Numeral 9 denotes a generator for generating electric power E by using the power generated from the gas turbine 6. Numeral 10 denotes an exhaust passage for guiding turbine exhaust gas C discharged from an outlet of the turbine. Numeral 11 denotes an exhaust gas boiler for heating water W supplied from a water supply passage 12 by the turbine exhaust gas 11 so as to produce high-temperature steam S. Both the electric power E generated by the generator 9 and the steam S generated by the exhaust gas boiler 11 are utilized as energy sourse for e.g. main production operation of the factory. Also, the turbine exhaust gas C' obtained after the production of steam by the exhaust gas boiler 11 is discharged to the outside through the exhaust passage 10.

That is to say, according to the exhaust gas treatment system described above, as the condensed gas B' containing the organic component transferred thereto from the treatment-object exhaust gas A is supplied as the oxygen-containing combustion gas to the gas turbine 6 together with the fuel G, so that the organic component transferred into the condensed gas B' is oxidized and decomposed by its combustion at the gas turbine 6 as the final stage of the exhaust gas treatment subsequent to the transfer of this component at the condensing device 1 and also heat generated in association with the oxidizing/decomposing process is recovered in an efficient manner in the form of the electric power E generated by the generator 9 and the steam S produced by the exhaust gas boiler 11, whereby the energy consumption of and $CO_2$ generation from the entire factory may be reduced.

Further, as the condensed gas B' with organic component concentration enhanced by the condensing device 1 is supplied as the oxygen-containing combustion gas to the gas turbine 6, a large amount of organic component may be charged into the gas turbine 6, thereby to significantly reduce the fuel consumption amount of this turbine 6 (in the case of the present embodiment, this amount is reduced to about 60% of the case without such introduction of organic component), so that the energy saving effect and $CO_2$ generation reducing effect are further promoted.

Figure 2:
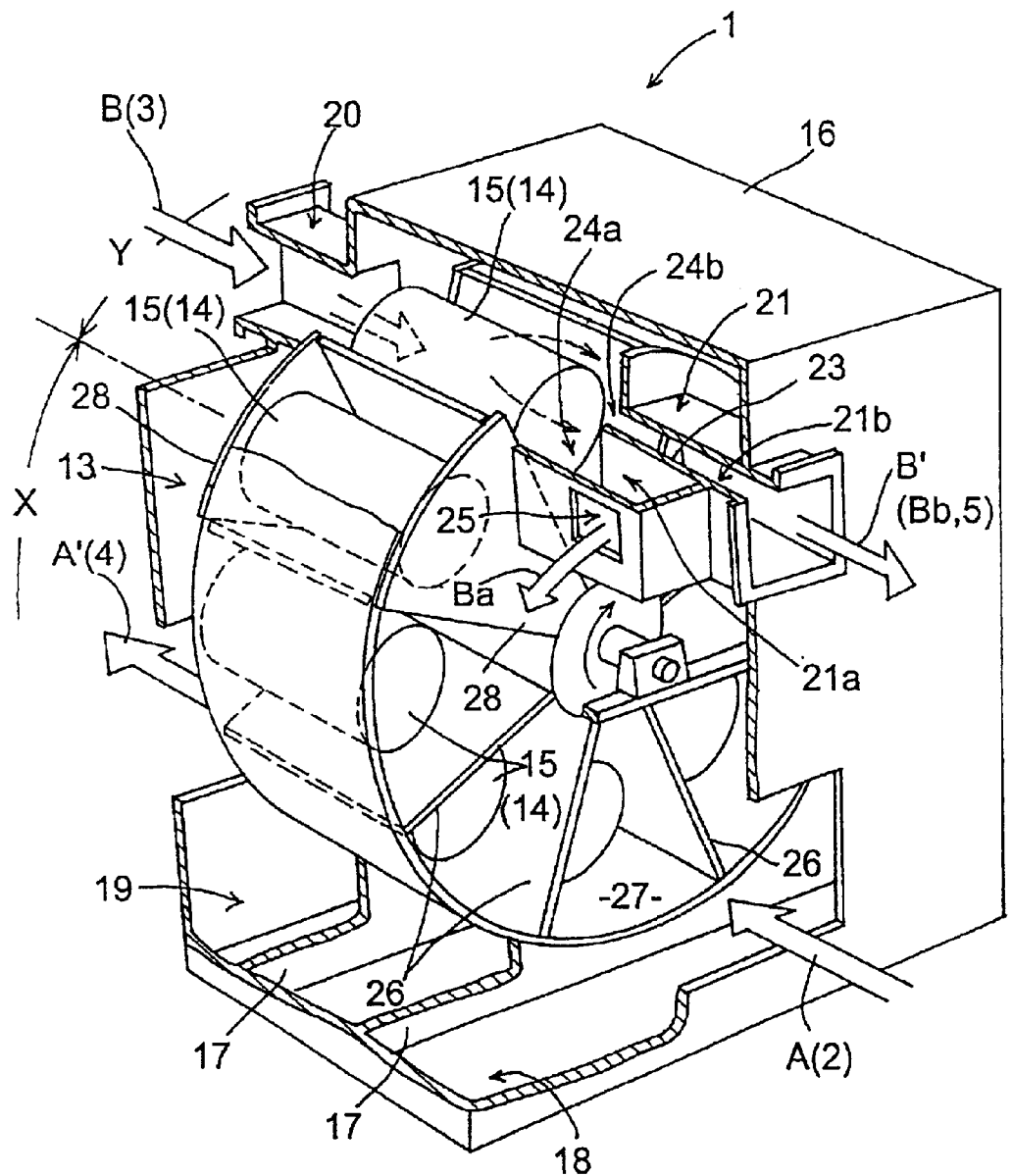
FIG. 2 is a partially cutaway perspective view showing an adsorbing-desorbing type condensing device.
Figure 3:
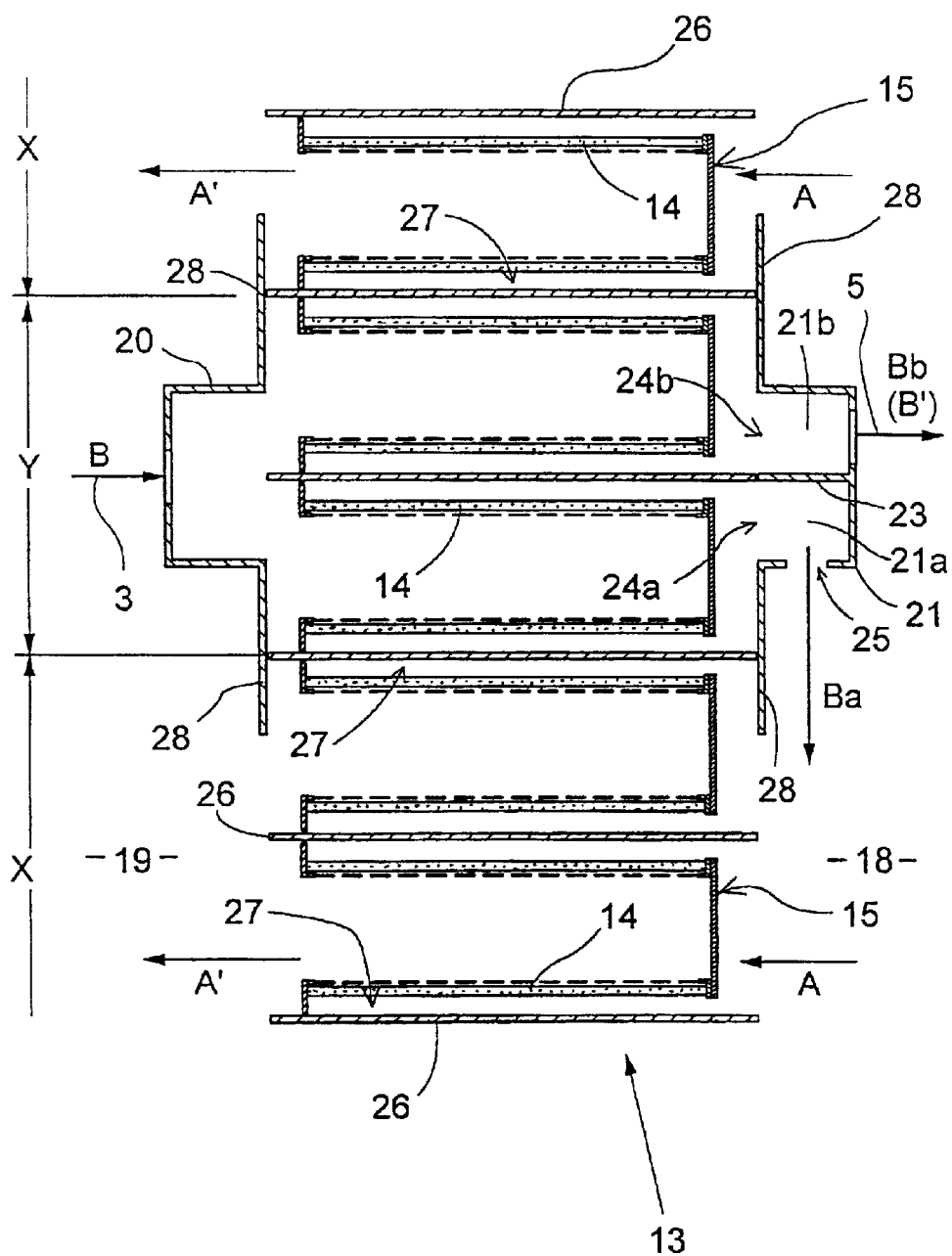
FIG. 3 is a development in a plan view showing a portion of an adsorbing rotor.
Figure 4:
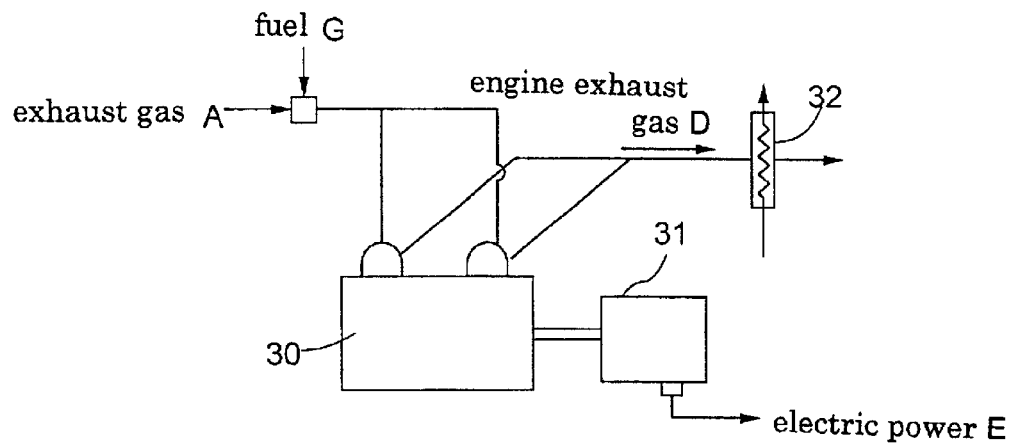
FIG. 4 is a schematic construction view showing a conventional exhaust gas treatment system using a gas engine.
Figure 5:
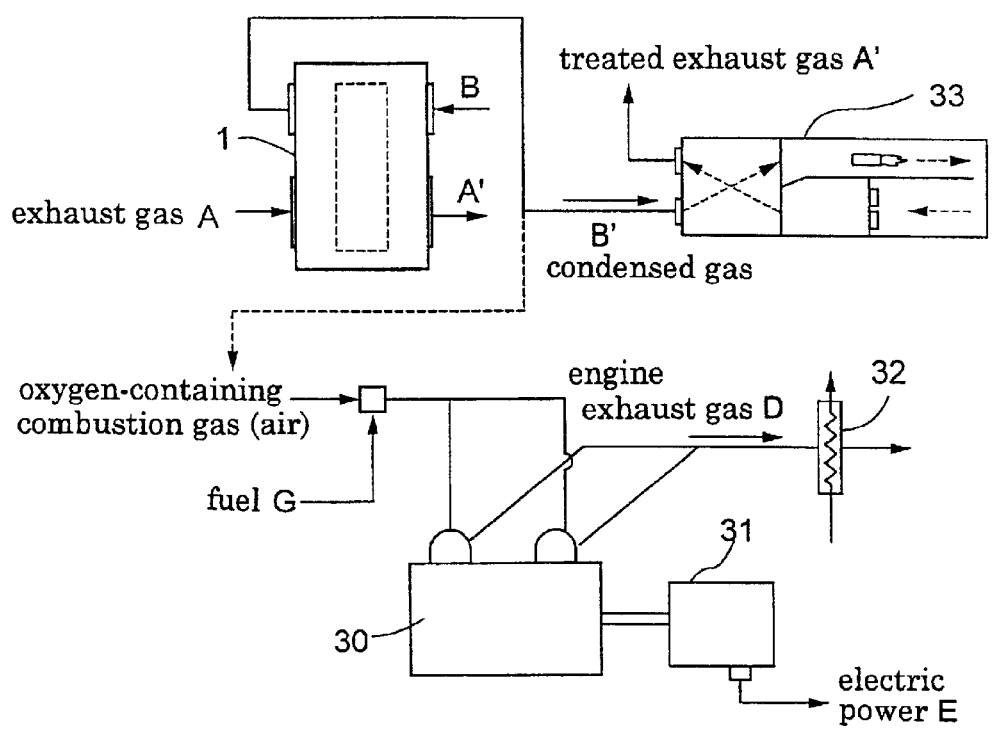
FIG. 5 shows a conventional co-generation system using the conventional exhaust gas treatment system using a gas engine.

As shown in FIGS. 1,2 and 3, the condensing device 1 is an rotary adsorption-desorption type device including a cylindrical or disc-shaped adsorbing rotor 13. The adsorbing rotor 13 supports a plurality of adsorbing cassettes 15 juxtaposed along a rotational direction of the rotor. Each cassette 15 is a bottom-dosed cylindrical body including an adsorbent layer 14 made of fibrous activated carbon affixed to its periphery. The adsorbing rotor 13 is housed in a casing 16. The inside of this casing 16 is partitioned, by means of a pair of rotor peripheral partitioning walls 17 provided at one end and the other end of the rotor 13 into an inlet chamber 18 facing one side of the rotor 13 and an outlet chamber 19 facing the other side of the rotor 13. The inlet chamber 18 is connected with the exhaust gas inlet passage 2, and the outlet chamber 19 is connected with the treated exhaust gas discharge passage 4.

Further, at a position in the rotational direction of the adsorbing rotor 13, there is provided an air-duct construction for causing the desorbing gas B to pass the adsorbing rotor 13 in the opposite direction to the treatment-object exhaust gas A. This air-duct construction consists essentially of an inlet chamber 20 and an outlet chamber 21 for the desorbing gas B. The inlet chamber 20 and the outlet chamber 21 are arranged in opposition to each other in such a manner that respective openings thereof face each other across a portion of the adsorbing rotor 13. The inlet chamber 20 disposed on the side of the outlet chamber 19 is connected with the desorbing gas inlet passage 3, and the outlet chamber 21 disposed on the side of the inlet chamber 18 is connected with the condensed gas inlet passage 5 for taking off the desorbing gas passed through the adsorbing rotor 13 as the produced condensed gas B'.

Also, as shown in FIG. 1, the desorbing gas inlet passage 3 incorporates therein a heater 22 as a desorbing heating source for preheating the desorbing gas B to be introduced into the adsorbing-desorbing device 1 as the condensing device.

That is to say, in this adsorbing-desorbing device 1, in the rotational path of the adsorbing rotor 13, an area where the respective opposed side faces of the rotor 13 are open to the inlet chamber 18 and the outlet chamber 19 which are disposed inside the casing is provided as an adsorbing area X, whereas an area where the one portion of the rotor 13 is communicated with the inlet chamber 20 and the outlet chamber 21 for the desorbing gas B is provided as a desorbing area Y.

At the adsorbing area X, the treatment-object exhaust gas A introduced through the exhaust gas inlet passage 2 into the inlet chamber 18 is caused to pass the adsorbent layer 14 of a particular portion of the adsorbing rotor which portion is just passing this area. Then, the period when the object gas A passes the adsorbing area X for the adsorbent layer 14 for each portion of the rotor comprises an "adsorbing step" for causing the treatment-object exhaust gas A to pass the adsorbent layer 14 of this particular rotor portion to adsorb the solvent vapor borne in this object gas A to the adsorbent layer 14. Specifically, the solvent vapor in the object gas A is adsorbed to an adsorbent forming the adsorbent layer 14.

On the other hand, at the desorbing area Y, the high-temperature desorbing gas B introduced through the desorbing gas inlet passage 3 into the inlet chamber 20 is caused to pass the adsorbent layer 14 of a particular portion of the adsorbing rotor which portion is just passing this area. Then, the period when the desorbing gas B passes the desorbing area Y for the adsorbent layer 14 for each portion of the rotor comprises a "desorbing step" for causing the high-temperature desorbing gas B to pass the adsorbent layer 14 of this particular rotor portion to desorb the adsorbed solvent vapor on the adsorbent layer 14 into the desorbing gas B.

In this way, with each rotation of the adsorbing rotor 13, the adsorbing operation at the adsorbing area X for the adsorbent layer 14 at a particular portion of the rotor and the desorbing operation at the desorbing area Y at a further particular portion of the rotor are effected alternately.

Hence, the operation at the desorbing area X for adsorbing and collecting the organic component from the object exhaust gas A and the further operation at the desorbing area Y for desorbing the adsorbed and collected solvent vapor into the desorbing gas B are effected in a continuous and parallel manner.

In these adsorbing and desorbing operations, the amount of the desorbing gas B caused to pass the adsorbent layer 14 at the desorbing area Y is set to be smaller than the amount of the treatment-object exhaust gas A caused to pass the adsorbent layer 14 at the adsorbing area X. As a result, the concentration of the organic component in the desorbing gas B delivered from the desorbing area Y into the outlet chamber 21 is rendered higher than the concentration of the organic component in the treatment-object exhaust gas A before its treatment through the adsorbent layer 14 at the adsorbing area X. On the other hand, the treated exhaust gas A' delivered into the outlet chamber 19 after having its organic component eliminated through the adsorption and collection by the adsorbent layer 14 as the gas was caused to pass the adsorbent layer 14 at the adsorbing area X is discharged via the treated exhaust gas discharge passage 4 to the outside as treated or cleaned gas.

Further, in this condensing device 1, the outlet chamber 21 for the desorbing gas B supports therein a partitioning member 23 (an example of "sorting means") for partitioning the inside of this chamber into two sections, i.e., an upstream chamber portion 21a and a downstream chamber portion 21b with respect to the rotational direction of the adsorbing rotor 13. This partitioning member 23 is provided in the form of a plate-like body extending along the radial direction of the rotor and partitions the outlet of the desorbing area Y for the desorbing gas into an upstream outlet portion 24a located upstream in the rotational direction of the rotor and a downstream outlet portion 24b located downstream in the same direction. From the upstream outlet portion 24a, there is delivered a portion of the desorbing gas portion B which passed the rotor portion which had entered desorbing area Y immediately before (this air or gas will be referred to as "earlier passage gas Ba meaning desorbing gas which passed the adsorbent layer at an earlier stage of the desorbing process). Namely, the temperature of the adsorbent layer 4 at the rotor portion which has just entered desorbing area Y is still low, so that much of the heat retained in the high-temperature desorbing gas B caused to pass the adsorbent layer 14 is used up for heating this adsorbent layer 14. Hence, there occurs a significant temperature drop which impairs the efficiency of the desorption of the condensation-target component, i.e., the organic component, adsorbed to the adsorbent layer. For this reason, this earlier passage desorbing gas Ba is low in the concentration of the organic component.

In contrast, from the downstream outlet portion 24b, there is discharged the other portion of the desorbing gas B which passed the rotor portion which portion had entered the desorbing area Y relatively long before, hence, had been held within this desorbing area Y for a certain extended period after its entrance thereto (this air or gas will be referred to as "later passage gas Bb meaning desorbing gas which passed the adsorbent layer at a later stage of the desorbing process). Namely, the temperature of the adsorbent layer 14 at the rotor portion which had been held within the desorbing area Y for a certain extended period after its entrance thereto is already sufficiently high. Therefore, there occurs no such temperature drop due to the loss of the heat retained in the high-temperature desorbing gas B in heating up the adsorbent layer 14, so that the desorbing operation of the target component may proceed efficiently. Therefore, this later passage desorbing gas Bb is high in the concentration of the organic component.

Further, regarding this outlet partitioning, the condensed gas outlet passage 5 connected with the outlet chamber 21 is connected with the downstream chamber portion of the outlet chamber 21, and regarding the upstream chamber portion 21a of the outlet chamber 21, there is provided a communication opening 25 for discharging the earlier passage gas Ba received from the corresponding upstream outlet portion 24a into the upstream chamber portion 21a into the inlet chamber 18 for the exhaust gas A.

Namely, as described above, the earlier passage gas Ba which passed the adsorbent layer 14 at an earlier stage of the desorbing process is low in the organic component concentration. Therefore, this gas is discharged through the communication opening 25 into the inlet chamber 18, so that it is mixed with new treatment-object exhaust gas A fed from the exhaust gas inlet passage 2 to be caused to pass the adsorbing area X again. That is, this earlier passage air is subjected to another condensing operation. On the other hand, the later passage gas Bb which passed the adsorbent layer 14 at a later stage of the desorption process is high in the organic component concentration. Thus, this gas is taken off or collected directly from the adsorbing-desorbing device 1 as the produced condensed gas B' via the downstream chamber portion 21b of the outlet chamber 21 and the condensed gas outlet passage 5 connected thereto. With this, the concentration ratio of the organic component in the exhaust gas may be maintained high, while avoiding the adverse effect of the earlier stage of the desorbing process when the desorbing efficiency is still low.

The inside of the adsorbing rotor 13 is divided, by means of a plurality of partitioning walls 26 extending radially from the rotational axis of the rotor 13, into a plurality of adsorbing cassette compartments 27 in the rotational direction of the rotor. Also, on the opposed sides of the inlet chamber 20 and the outlet chamber 21 respectively, there are provided shielding plates 28 for preventing intrusion of the treatment-object exhaust gas A into the adsorbing rotor 13 limitedly at a predetermined angular area corresponding to one adsorbing cassette compartment 27. That is to say, with rotation of the adsorbing rotor 13, the side edge of the respective partitioning wall 27 comes into opposition to the shielding plate 28 one after another. In this, while a certain partitioning wall 26 is placed in opposition to the shielding plate 28, a shielded condition is established between this partitioning wall 26 and the shielding plate 28. Accordingly, irrespectively of the rotational position of the adsorbing rotor 13, there does not occur such condition wherein a same single adsorbing cassette compartment 27 extends across the passage for the exhaust gas A and across also the passage for the desorbing gas B at the same time. Namely, the shielding plates 28 prevent inadvertent mixing of the exhaust gas A and the desorbing gas B through a common adsorbing cassette compartment 27.

Incidentally, each partitioning wall 26, in cooperation with the partitioning member 23 of the outlet chamber 21, functions to guide earlier passage gas Ba into the upstream chamber portion 21a of the outlet chamber 21 and functions also to guide the later passage gas Bb into the downstream chamber portion 21b of the outlet chamber 21.

The followings are some examples of air or gas volumes and concentration values at the respective sections of the exhaust gas treating system relating to this embodiment.

exhaust gas A: gas volume v=1000 m$^3$/min
  organic component concentration d=100 ppm
condensed gas B': gas volume v=33 m$^3$/min
  organic component concentration d=3000 ppm
  (thus the concentration rate of 30 times)
power output of generator 9: E=100 kW
fuel consumption of gas turbine 6: G=231000 kcal/h
steam S output of exhaust gas boiler 11: S=400 kg/h
temperature of turbine exhaust gas: C'=200 to 250° C.

OTHER EMBODIMENTS

Next, other embodiments of the condensing apparatus relating to the present invention will be described.

In the foregoing embodiment, the condensing device 1 comprises the disc-shaped adsorbing rotor 13 mounting a plurality of bottom-dosed cylindrical adsorbing cassettes 15 juxtaposed along the rotational direction of the rotor. In embodying the present invention, when a rotary adsorbing-desorbing device is employed as the condensing device 1, the specific construction of the adsorbing rotor is not limited thereto. Instead, the rotor may be a disc-shaped adsorbing rotor including a plurality of adsorbent-layer "locks" juxtaposed along the rotational direction of the rotor. Or, it may be a cylindrical adsorbing rotor rotatable about the cylinder axis, through which the gas is caused to pass in the direction perpendicular to the rotational axis. Further alternatively, the rotor may be one having an endless rotary construction mounting a belt-like adsorbent layer thereon.

Also, when an adsorbing-desorbing device is employed as the condensing device 1, this adsorbing-desorbing device is not limited to the rotary type using an adsorbing rotor. Instead, it may be an adsorbing tower type device in which the treatment-object exhaust gas A and the desorbing gas B are selectively provided to an adsorbent layer fixedly mounted inside an adsorbing tower.

Further, in such adsorbing tower type adsorbing-desorbing device, the sorting means for sorting between the earlier passage gas Ba and the later passage gas Bb may be constructed e.g., of a valved device for periodically switching the outlet passage for the desorbing gas B delivered from the adsorbent layer so as to sort between the earlier passage gas Ba and the later passage gas Bb.

Also, the sorting "point" between the earlier passage gas Ba and the later passage gas Bb (namely, the sorting point between an earlier stage and a later stage in the desorbing process) is not limited to the mid point in the desorbing process. Instead, depending on various conditions, the sorting point may be set closer to the start point or the end point of the desorbing process. Moreover, the sorting means may be adapted to vary the sorting point between the earlier passage gas Ba and the later passage gas Bb, depending on various conditions. If such construction is to be realized in the foregoing embodiment described above, this is possible by e.g., adapting the position of the partitioning member 23 to be variable along the rotational direction of the adsorbing rotor. In these manners, the sorting means may be adapted to be capable of varying the sorting point between the earlier passage gas Ba and the later passage gas Bb.

Further, if the required concentration rate is obtainable without such sorting means, the condensing device 1 may be an adsorbing-desorbing device without the sorting means.

The specific type of the condensing device 1 for condensing organic component in exhaust gas A to produce condensed gas B' with enhanced concentration of the organic component is not limited to the absorbing-desorbing type device described above, but may be selected appropriately, depending on e.g., the type of the organic component of the exhaust gas, the particle size of the organic component, etc. For instance, when the size of the particle of the organic component of the exhaust gas is relatively large, a condensing device using a cyclone or filter may be suitably employed.

Further alternatively, a plurality of such condensing devices (e.g., a plurality of the adsorbing-desorbing type condensing devices) may be employed such that the condensing process is carried out in a multiple of stages, such as a first-stage condensing device produces primary condensed gas from the exhaust gas A, a second-stage condensing device produces secondary condensed gas from the primary condensed gas, and so on.

In the above embodiment, the heat retained in the turbine exhaust gas C is recovered in the form of steam S by using the exhaust gas boiler 11. However, the manner of recovering the heat of the turbine exhaust gas C is not limited thereto. For instance, the heat may be recovered also in the form of hot water or hot air by using various types of heat exchangers.

Further, the electric power E generated by driving the generator 9 by means of the gas turbine 6 or the heat recovered from the turbine exhaust gas C may be utilized for any other purpose than that in the facility generating such power E or the exhaust gas A therein. Instead, they may be utilized for a different facility than the facility generating the exhaust gas A Although it is preferred that the organic component concentration of the condensed gas B' to be fed to the gas turbine 6 as the combustion oxygen-containing gas be set to 3000 ppm or higher, the specific concentration value thereof may vary, depending on various conditions. In some cases, it may be set to 3000 ppm or lower. Further, in the foregoing embodiment, air is employed as the desorbing gas B which is used as the "source gas" for the condensed gas B'. However, as this source gas for the condensed gas B' (the desorbing gas B in case the adsorption-desorption apparatus is employed as the condensing device 1), any other kind of gas than air may be employed as long as the condensed gas B' produced therefrom is usable as the combustion oxygen-containing gas for the gas turbine 6.

Moreover, the exhaust gas treating system described above may be used not only for the treatment of the organic solvent containing gas generated from a painting facility or a semiconductor/electronic component manufacturing facility, but also for treatment of other kinds of exhaust gases containing various kinds of organic components.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. An exhaust gas treatment system comprising:
    a condensing device for condensing an organic component contained in exhaust gas to be treated so as to produce condensed gas with an enhanced organic component concentration;
    a gas turbine for receiving the condensed gas from the condenser device as oxygen-containing combustion gas and then generating power; and
    a generator operable to receive the power from the gas turbine for generating electric power,
    wherein the condensing device comprises an adsorbing-desorbing device by effecting an adsorbing step for adsorbing the organic component of the exhaust gas onto an adsorbent layer by causing the exhaust gas to pass the adsorbent layer and a desorbing step for desorbing the adsorbed organic component into a desorbing gas, which is smaller in amount than the exhaust gas, by causing desorbing gas to pass the adsorbent layer after the adsorbing step, the device effecting the adsorbing step and the desorbing step for a plurality of cycles, so that the desorbing gas delivered from the adsorbent layer during the desorbing step is collected as the condensed gas to be discharged from the condensing device.

2. The exhaust gas treatment system according to claim 1, wherein the adsorbing-desorbing condensing device includes a sorting means for sorting the desorbing gas delivered from the adsorbent layer during the desorbing step between an earlier passage gas which passed the adsorbent layer at an earlier stage of the desorbing step and a later passage gas which passed the adsorbent layer at a later stage of the desorbing step and for subsequently causing the earlier gas, as an additional portion of the exhaust gas, to pass the adsorbent layer again at a subsequent adsorbing step while allowing the later passage gas to be discharged directly as the condensed gas.

3. The exhaust gas treatment system according to claim 2, wherein the adsorbing-desorbing device comprises a rotary adsorbing-desorbing device.

4. An exhaust gas treatment system comprising:
a condensing device for condensing an organic component contained in exhaust gas to be treated so as to produce condensed gas with an enhanced organic component concentration;
a gas turbine for receiving the condensed gas from the condenser device as oxygen-containing combustion gas and then generating power; and
a generator operable to receive the power from the gas turbine for generating electric power,
wherein the condensing device is capable of providing a concentration rate of approximately 30 times or more of the organic component in the exhaust gas.

5. The exhaust gas treatment system according to claim 1, wherein the condensing device is capable of providing a concentration rate of approximately 30 times or more of the organic component in the exhaust gas.

6. The exhaust gas treatment system according to claim 2, wherein the condensing device is capable of providing a concentration rate of approximately 30 times or more of the organic component in the exhaust gas.

* * * * *